United States Patent [19]
David et al.

[11] Patent Number: 5,895,540
[45] Date of Patent: Apr. 20, 1999

[54] METHOD FOR UNITIZING CONTAINERS

[75] Inventors: John Richard David, Stillwater; Dee Lynn Johnson, Woodbury; Kenneth Francis Knoll, Hastings, all of Minn.; Curtis Larson, Hudson, Wis.; Graham Edward Thoms, St. Paul; Raymond Daniel Zachrison, Lindstrom, both of Minn.

[73] Assignee: Minnesota Mining and Manufacturing Company, St. Paul, Minn.

[21] Appl. No.: 08/121,668

[22] Filed: Sep. 15, 1993

Related U.S. Application Data

[63] Continuation of application No. 07/781,515, Oct. 22, 1991, abandoned.

[51] Int. Cl.⁶ .................................................. B32B 31/00
[52] U.S. Cl. .......................... 156/226; 53/419; 53/484; 53/485; 53/488; 156/281; 156/312; 156/3.3; 206/386; 206/504; 414/786; 414/788.1; 414/904
[58] Field of Search ........................ 156/281, 312, 156/313, 226; 53/419, 485, 484, 488; 414/788.1, 786, 904; 410/35; 206/386

[56] References Cited

U.S. PATENT DOCUMENTS

| | | |
|---|---|---|
| Re. 30,787 | 11/1981 | Pool et al. . |
| 2,387,593 | 10/1945 | Lesser . |
| 2,565,509 | 8/1951 | Marcin . |
| 2,805,183 | 9/1957 | Higgins . |
| 3,193,433 | 7/1965 | Tillotson . |
| 4,365,710 | 12/1982 | Swanson .................. 206/386 |
| 4,415,400 | 11/1983 | Rammelmeyr . |
| 4,582,737 | 4/1986 | Torgerson et al. . |
| 4,741,935 | 5/1988 | Sheehan . |
| 4,981,537 | 1/1991 | Heil et al. . |

FOREIGN PATENT DOCUMENTS

| | | |
|---|---|---|
| 0 188 375 A3 | 7/1986 | European Pat. Off. . |
| 0 283 405 A1 | 9/1988 | European Pat. Off. . |
| 2037695 | 7/1980 | United Kingdom ......... 206/386 |

OTHER PUBLICATIONS

Publication: 3M Technical Data Sheet Entitled YR-9440 Load Stabilization Tape.

*Primary Examiner*—John J. Gallagher
*Attorney, Agent, or Firm*—Michaele A. Hakamaki

[57] ABSTRACT

A linerless double-backed adhesive tape structure is disclosed. In one embodiment the tape has three tape strips each with an adhesive coated surface and an adhesive free surface. Two of the strips are joined to a center strip along its lateral edges with the adhesive coated surfaces of the two strips overlapping and adhered to the adhesive coated surface of the center strip. Also disclosed is a method of unitizing and sealing a plurality of containers. In one embodiment a double-backed adhesive tape structure is adhered to each of the containers and the containers are stacked together with the exposed adhesive side of the tape on each container adhered to the exposed adhesive side of the tape on an adjacent container. Finally, an apparatus for dispensing the double-backed adhesive tape of the present invention is disclosed.

13 Claims, 7 Drawing Sheets

5,895,540

METHOD FOR UNITIZING CONTAINERS

This is a continuation of application Ser. No. 07/781,515 filed Oct. 22, 1991, now abandoned.

BACKGROUND OF THE INVENTION

The present invention relates broadly to a double-backed adhesive tape structure and to a method of unitizing containers with the tape structure. The present invention also relates to an apparatus for dispensing the tape structure. Double-backed adhesive tape is well-known in the prior art. Typically, the tape is coated on both sides with a pressure sensitive adhesive. Because there is a strong adhesive bond that would be formed between the front and back layers of adhesive it is necessary in the prior art to use a release liner as an intermediate layer allowing the tape to be wound upon a roll or formed into a pad. The use of release liner increases the cost of the tape system. Through careful selection of the adhesives, it may be possible to produce linerless double-backed tape. However, this is generally unsatisfactory because it imposes significant limitations on the tapes that can be developed.

Unitizing containers refers to stacking containers for storage and/or transportation. Containers, such as cardboard boxes, are stacked together on a pallet. In the prior art plastic shrink wrap or stretch wrap is used around the entire stacked configuration to secure the containers on the pallet. The plastic wrap must ultimately be disposed of in some manner. There are environmental concerns raised by the use of such materials. In addition the plastic wrap adds costs associated with the products. One added cost item is that an extra step in the packaging is required since the shrink or stretch wrap operation is usually separate from the box sealing operation.

The present invention solves these problems in the prior art by employing single coated tape to form a double-backed adhesive tape structure. Through the selection of the component tapes, the structure of the present invention has wide applications and versatility. The invention does not require the use of a release liner and can be formed into pads or rolls or can be applied directly to containers. The use of the tape structure to unitize containers eliminates the need for undesirable and ecologically unsatisfactory plastic shrink wrap. The tape structure functions to both seal the containers as well as secure the containers together in a stacked configuration.

SUMMARY OF THE INVENTION

The present invention is a linerless double-backed adhesive tape structure useful in a wide variety of applications and an apparatus for dispensing the tape. The present invention is also a method for unitizing a plurality of containers. It includes a first tape strip having an adhesive layer on one side thereof, and second and third tape strips also having adhesive layers on one side thereof. The second and third tape strips overlie the edges of the first tape strip with the adhesive side of the second and third tape strips facing the adhesive side of the first tape strip whereby the second and third tape strips are adhered to the first tape strip.

One application of the tape structure of the present invention is in a combination container closure and unitizing system. In a preferred embodiment of this application, the three tape system is used to seal the top and bottom of containers, such as boxes, with the adhesive sides of the second and third tape strips adhered to the container with the adhesive side of the first tape strip exposed. The boxes are then stacked on each other with the exposed adhesive side of the first tape strip on one box in contact with and adhered to the exposed adhesive side of the first tape strip on an adjoining box. In alternatiave embodiments of the unitizing method the exposed adhesive of the first tape strip can also be adhered to the non-adhesive side of tape on an adjoining box or directly to the bottom of the container such as a cardboard box. In either method the result is a unitized assembly of containers held together in a stable configuration for storage and/or transportation. Further, in one preferred embodiment of the unitizing system the ends of the tape structure closing the top and bottom of the boxes is adhered to the end panels of the box so that the ends of adjacent boxes are similarly securely joined to each other by the exposed adhesive side of the tape. It has been found that boxes when unitized in this manner are secure on a pallet for transportation. This novel unitizing method eliminates the need that existed in prior art for a securing means such as a plastic wrap around the entire pallet. Plastic wrapping of this type, in addition to adding costs, is ecologically undesirable.

The tape structure of the present invention can be formed into rolls or pads without the need of a release liner as in the prior art. This novel tape structure has been found to have a wide variety of useful applications. These and other advantages of the present invention will become apparent with reference to the accompanying drawings, detailed description of the preferred embodiment, and claims. The present invention is not limited to the specific examples disclosed herein and there may be other ways to practice the claimed invention.

DETAILED DESCRIPTION OF THE PREFERRED EMBODIMENT

Figure 1:
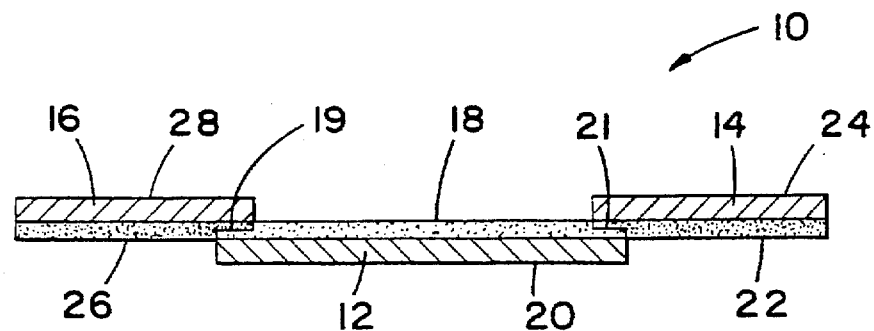
FIG. 1 is an end elevational view showing the construction of the linerless double-backed tape structure of the present invention.
Figure 13:
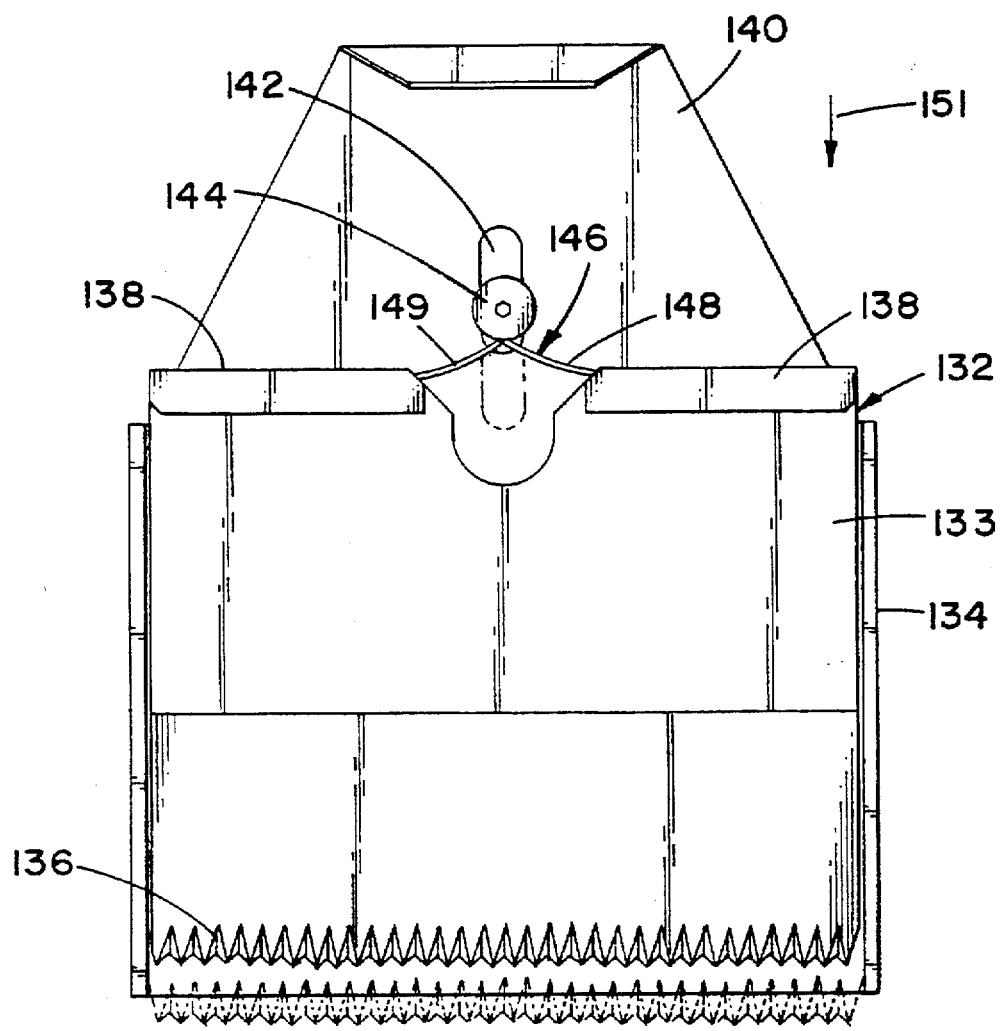
FIG. 13 is an end elevational view of the dispenser shown in FIG. 10.

Referring to the figures wherein like numerals represent like parts throughout the several views, the linerless double-backed tape structure of the present invention is designated generally as 10. Tape structure 10 includes a first tape strip 12 and second and third tape strips 14 and 16, respectively. Tape strip 12 has one side 18 coated with an adhesive which may be a pressure sensitive type. The adhesive may also be moisture activated or heat activated. An opposite side 20 of first tape strip 12 is adhesive free. Second tape strip 14 has an adhesive coated on one side 22 thereof and an opposite side 24 that is adhesive free. Similarly, third tape strip 16 has an adhesive on one side 26 thereof and an opposite side 28 that is adhesive free. Second and third tape strips 14 and 16 overlap first tape strip 12 along the lateral edges 19 and 21 thereof with adhesive coated sides 22 and 26 in face-to-face contact with adhesive coated side 18. Adhesives on sides 22 and 26 may also be of the pressure sensitive type. This overlapping construction results in tape strips 14 and 16 being firmly secured to tape strip 12, leaving exposed adhesive on side 18 facing in an opposite direction to exposed adhesive on sides 22 and 26. As is known in the prior art the adhesive free surfaces of the tape strips are typically coated with a low adhesive backsizing (LAB).

Tape structure 10 can be made into a roll or pad without the need for a liner because in the roll or pad configuration, the exposed adhesive on sides 18, 22 and 26 will not lie in contact with each other but will be in contact with non-adhesive surfaces of the tape. Thus, the tape can be removed from the roll or pad easily. Also, the tape structure 10 can be applied directly to a container in a laminating process wherein, for example, tape strips 12, 14 and 16 are laid directly onto a container to form the three tape structure of FIG. 1 while at the same time closing and sealing the container. Tapes that are suitable for producing the double-backed tape structure of the present invention include, but are not limited to, 3M brand box sealing tape 371, 3M brand box sealing tape 373, 3M brand box sealing tape 355, 3M brand tape 622, Scotch® brand transparent tape 600, Scotch® brand removable tape 811, Scotch® brand magic tape 810, and Scotch® brand masking tape.

Figure 2:
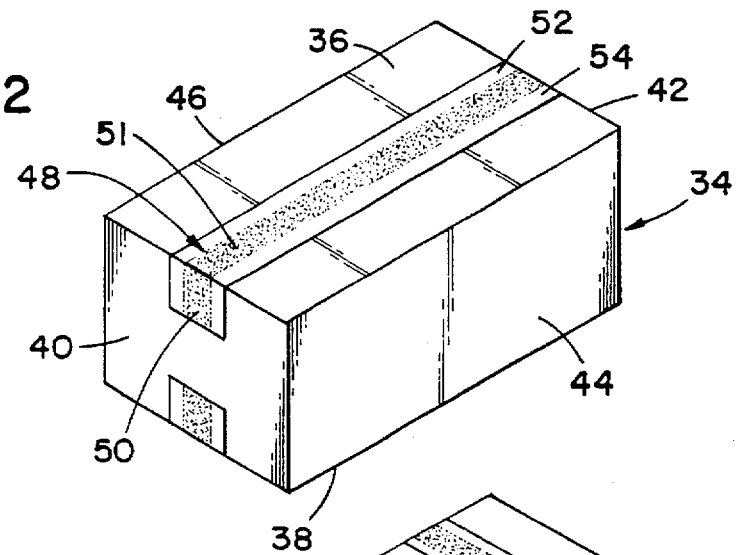
FIG. 2 is a view in perspective showing a container or box having its top and bottom closed by the tape structure of the present invention.
Figure 3:
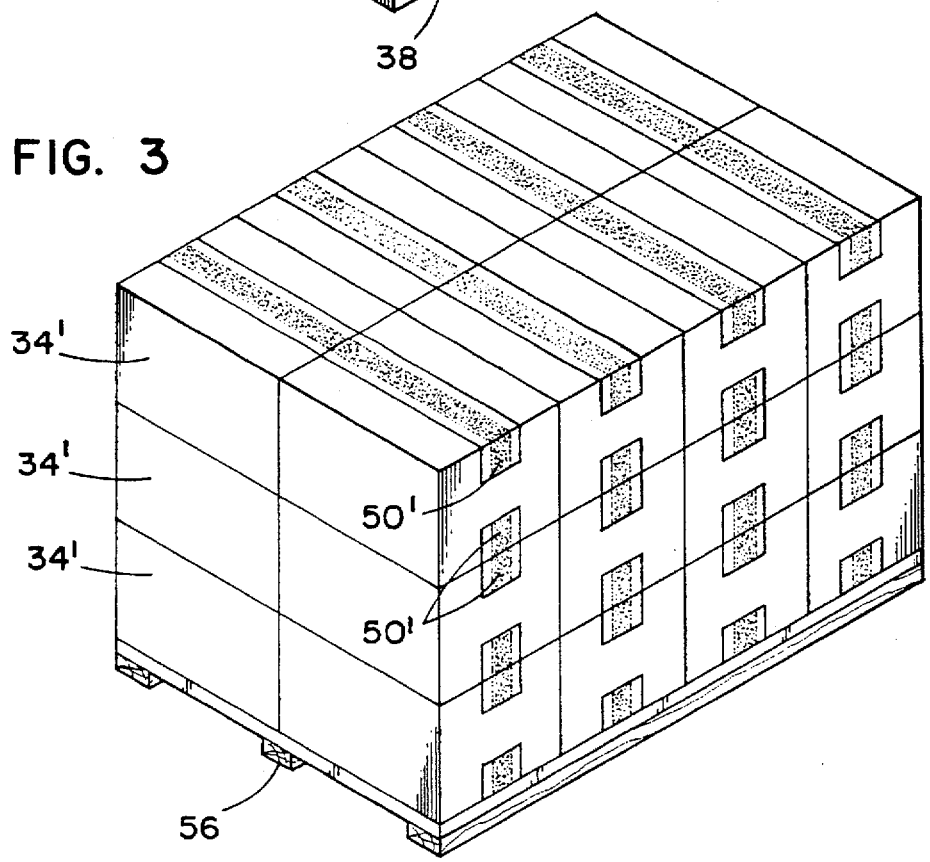
FIG. 3 is a view in perspective showing the tape structure in use in a unitizing system for a plurality of containers or boxes having the tape attached thereto as illustrated in FIG. 2.

A unitizing system utilizing the novel tape structure of the present invention is shown with reference to FIGS. 2 and 3. A box 34, which may be typically of cardboard construction, has a top 36, bottom 38, endwalls 40, 42, and sidewalls 44 and 46. A linerless double-backed adhesive tape structure 48 having the construction illustrated in FIG. 1 is used to close and seal top 36 and bottom 38. A first tape strip 50 has its adhesive side 51 facing away from box 34 while tape strips 52 and 54 have their adhesive sides facing toward box 34 and in contact and adhered to box 34. In a preferred embodiment of the unitizing system using the novel tape of the present invention, the ends of tape structure 48 are attached to end walls 40 and 42 of box 34. FIG. 3 shows a plurality of boxes 34' stacked on a pallet 56 for transportation. Boxes 34' are stacked on one another so that the exposed adhesive side 51 on the top and bottom of a box faces and is adhered to the exposed adhesive side 51 on an adjoining box. Similarly, exposed adhesive side 51 of adjoining ends 40 and 42 are secured together. A tie layer, such as paper, may be laid across the top of the unitized configuration and adhered to adhesive sides 51. The tie layer further stabilizes and unitizes the stacked boxes. Use of tape structure 48 in this manner creates a very stable and secure stacking for transportation and storage. The adhesive on side 50 is selected so that while holding the plurality of boxes together on a pallet without the need for external wrapping as in the prior art, the boxes can nevertheless be separated from each other relatively easily.

Figure 3A:
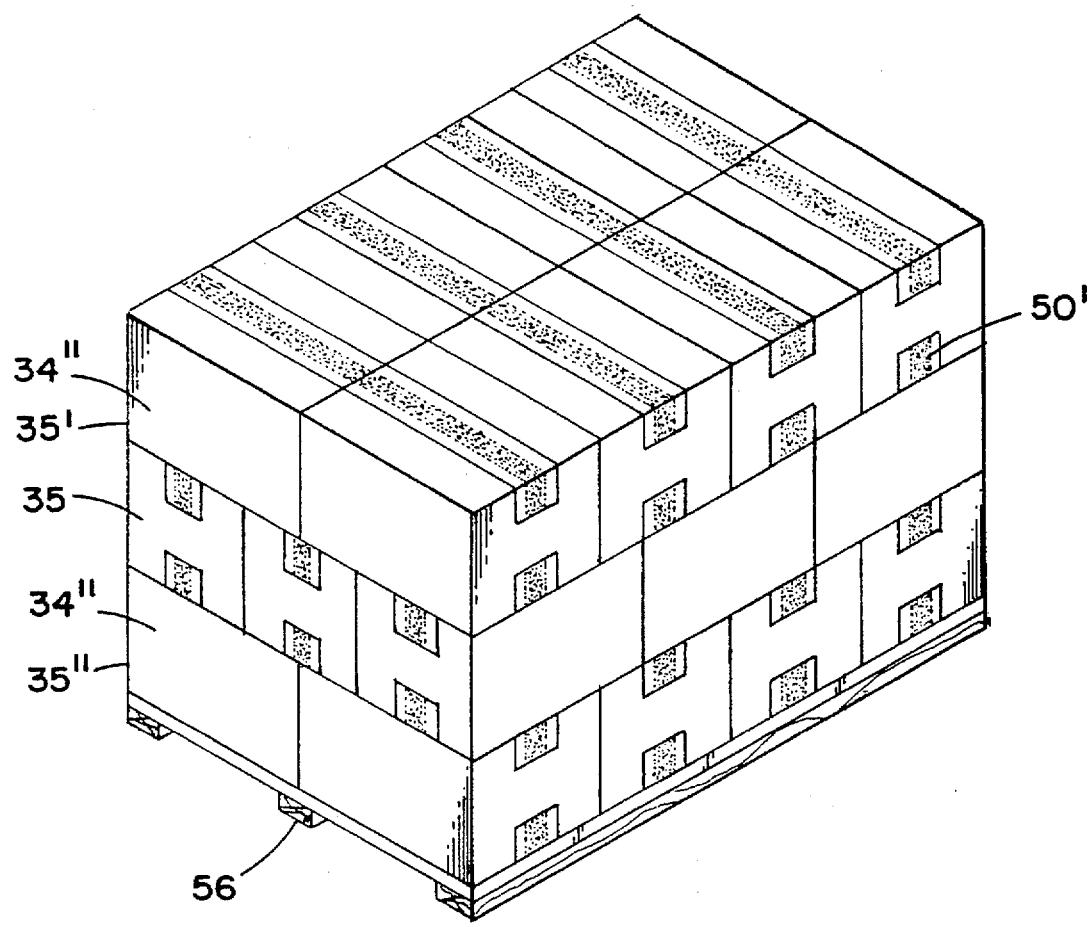
FIG. 3A is a view in perspective showing the tape structure in use in a unitizing system similar to FIG. 3 but with the boxes stacked in an interleaved layer.

FIG. 3A shows an alternative stacking arrangement for containers 34" where interlocking layer 35 is stacked with the containers therein oriented transverse to the adjacent layers 35' and 35". This staggered configuration also creates very stable stacked containers.

Figure 4:
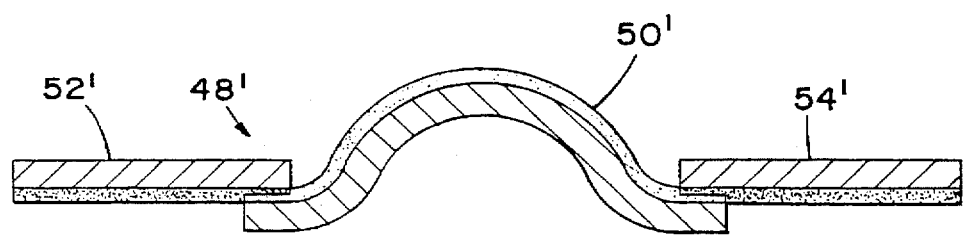
FIG. 4 is an end elevational view showing an alternative means of using the tape structure in a unitizing system.

FIG. 4 shows tape structure 48' with the first or center tape strip 50' bowed so that it has a portion raised above second and third tape strips 52' and 54'. Typically, this can be done when tape structure 48' is being applied to a box or container and is accomplished by moving the lateral sides of the tape structure inwardly during its application. This particular structure is useful in obtaining firm adherence between tape strips 50' on adjoining boxes. By providing an upraised portion of tape strip 50' typically more face-to-face contact can be achieved. This embodiment is particularly useful on long boxes or underfilled boxes where the box tends to sag in the middle.

Figure 5:
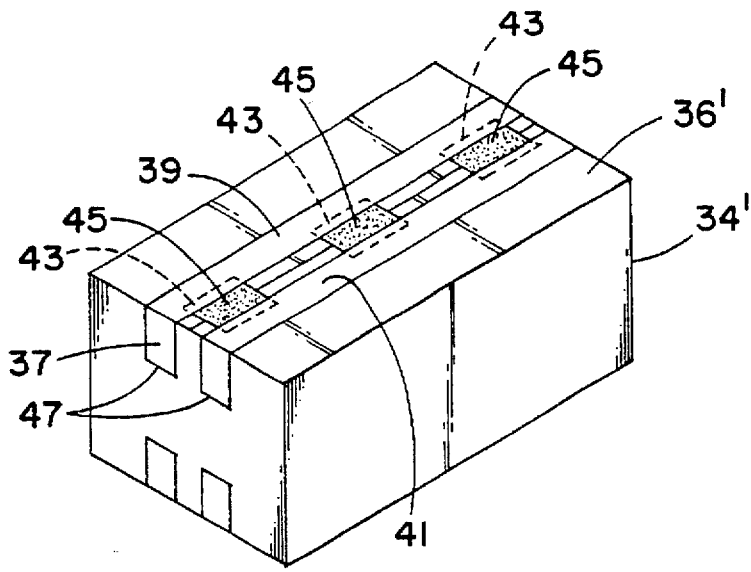
FIG. 5 illustrates an alternative embodiment of the tape structure of the present invention shown sealing the top of a container.

FIG. 5 shows a box 34' with a top 36' which is sealed by an alternative embodiment of the tape structure of the present invention designated generally as 37. Tape structure 37 has elongate tape strips 39 and 41 each of which is a single sided adhesive tape with the adhesive side in contact with top 36' thereby sealing box 34'. Spaced apart along the longitudinal axis of tape structure 37 are a plurality of middle tape strips 43 which are also single sided adhesive tape. An adhesive side 45 of strips 43 faces outward from top 36' to adhere to the bottom of a box stacked on box 34'. Tape strips 39 and 41 may extend onto the ends of box 34' as shown at 47. Tape strips 39, 41 are adhered to tape strips 43 by overlapping of the adhesive coated sides of each as described above. The tape structure of this embodiment uses less tape to form the double-backed structure since the middle tape strip is formed of spaced segments instead of a continuous strip as shown in FIGS. 1–3.

In an alternative embodiment of the present invention in a unitizing system, tape structure 48 may be applied to only top 36 of box 34. Other means could be used to close and seal bottom 38, such as conventional sealing tape. When boxes 34 are stacked on each other in this embodiment, adhesive side 51 adheres to bottom 38 of an adjacent box also creating a stable unitized structure.

Figure 7:
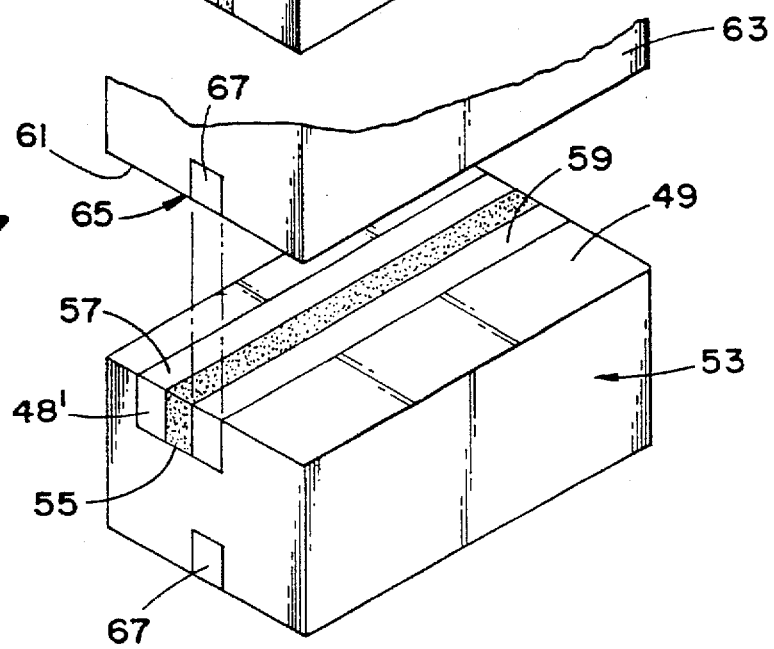
FIG. 7 illustrates an alternative embodiment of the method of container unitizing using in part the tape structure of the present invention shown in FIG. 1.

FIG. 7 shows one of such alternative embodiments. There tape structure 48' is applied to a top 49 of a box 53. Tape structure 48' may have the same construction shown in FIG. 1. It includes a single sided adhesive first tape strip 55 with its adhesive coated side facing outward and single sided adhesive second and third tape strips 57 and 59 with adhesive coated sides adhering to top 49. As shown tape structure 48' may be offset from the center of top 49 whereby tape strip 59 provides a full seal at the open seam on top 49 of box 53 and tape strip 55 is adhered to the fiberboard bottom 61 of an adjacent box 63 at a location designated as 65 which is spaced apart from a conventional single sided adhesive tape 67 which is used to seal the bottom of box 63.

Figure 6:
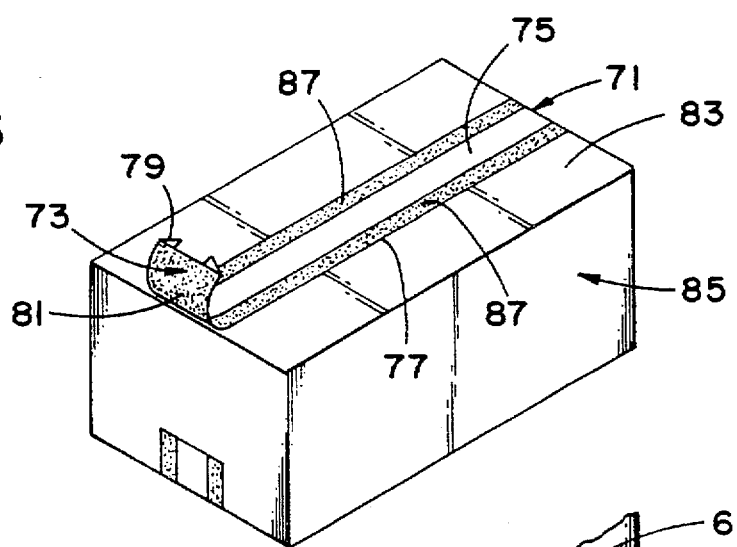
FIG. 6 is a view illustrating an alternative method of unitizing containers using a single sided adhesive tape.

FIG. 6 illustrates a unitizing method of the present invention using a single sided adhesive tape 71 with an adhesive coated side 73 and an adhesive free side 75. Opposite edges 77 and 79 of tape 71 are folded to expose outwardly a portion 87 of adhesive side 73. A nonexposed portion 81 of side 73 is adhered to a top 83 of a container 85 sealing top 83. Exposed portion 87 of adhesive side 73 may be adhered to a container stacked on container 85. Also tape 71 may be adhered to container 85 with only one edge 77 or 79 folded to expose adhesive side 73 along only one of said edges. The embodiment of FIG. 6 creates a bowing similar to that in FIG. 4 and is thus particularly useful in the same type of applications as the structure of FIG. 4.

Figure 8:
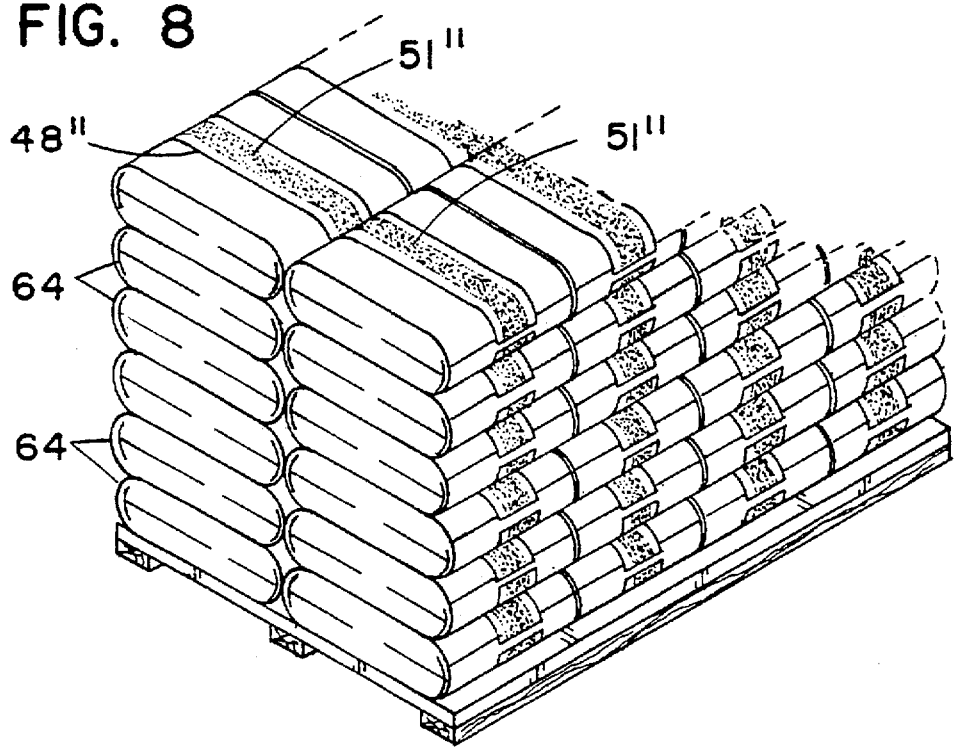
FIG. 8 shows a three tape structure unitizing a plurality of bags.

Moreover, the unitizing system of the present invention is not limited to boxes. As shown in FIG. 8, tape structure 48" may be applied to bags 64 so that adhesive sides 51" on adjacent bags are adhered to each other. It should be understood that containers of other shapes could also be unitized using the tape of the present invention.

Figure 9:
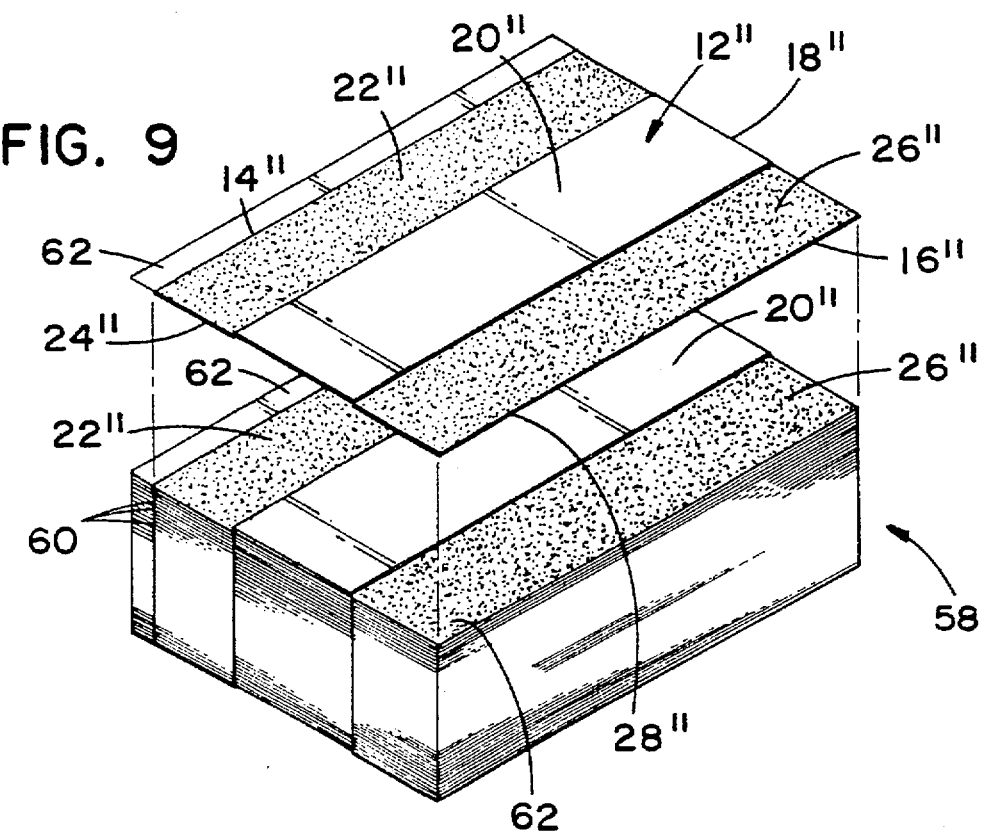
FIG. 9 shows a tape pad incorporating the linerless double-backed adhesive tape of the present invention.
Figure 10:
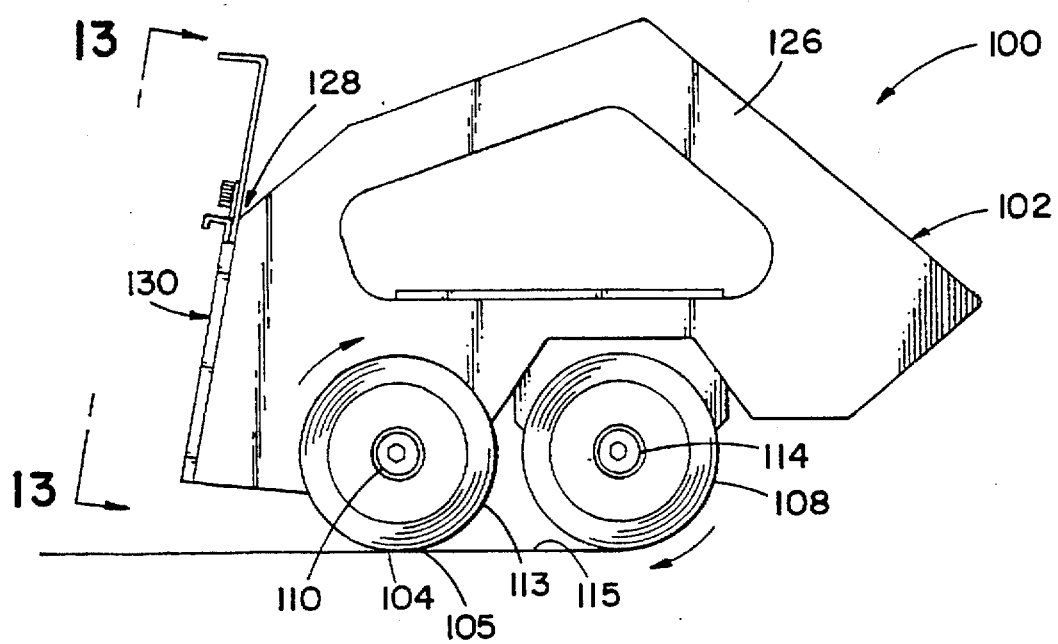
FIG. 10 is a side elevational view illustrating the apparatus for dispensing the tape structure of the present invention.

FIG. 9 illustrates a pad of tape structure, each layer of which has a structure of FIG. 1. The pad 58 comprises a plurality of linerless double-backed adhesive strips 60 having the structure shown in FIG. 1. A first tape strip 12" has an adhesive coated side 18" and a non-adhesive coated side 20". Second and third tape strips 14" and 16" have adhesive coated surfaces 22" and 26" respectively, and non-adhesive coated surfaces 24" and 28". In a stacked configuration illustrated in FIG. 9, adhesive coated surface 18" contacts the non-adhesive coated surface 20" of an adjacent tape strip. Similarly, adhesive coated surfaces 22" and 26" contact non-adhesive coated surfaces 24" and 28" of an adjacent tape strip. Thus, there is no adhesive-to-adhesive contact between the plurality of strips 60. Also, adhesives are selected to have characteristics such that the individual tape strips of pad 58 can be easily removed from the pad for use. Tabs 62 may be attached along a lateral edge of each strip 60 to facilitate removal of each of the strips from pad 58. In other words, tabs 62 may be attached to the adhesive surface of tape strip 14" or 16" along the lateral edge thereof and are not adhesively attached to each other. The user can thus simply grip tab 62 and pull one of the strips 60 from pad 58. Tabs 62 may be removable or permanently affixed to the tape.

While the linerless double-backed adhesive tape structure of the present invention has been described above with reference to three tape strips, it should be understood that additional tape strips having adhesive on only one side thereof could be added to the construction to create, for example, a five strip linerless double-backed adhesive tape. Referring to FIG. 1, this could be accomplished by the addition of fourth and fifth tape strips placed at the outer edges of tape strips 14 and 16, each having an adhesive layer facing upward and overlapping tape strips 14 and 16 at the outer edges thereof with adhesive and face-to-face contact with adhesive surfaces 22 and 26, respectively. Multiple tape strip configurations in addition to that specifically shown in FIG. 1 are within the spirit and scope of the present invention.

Figure 11:
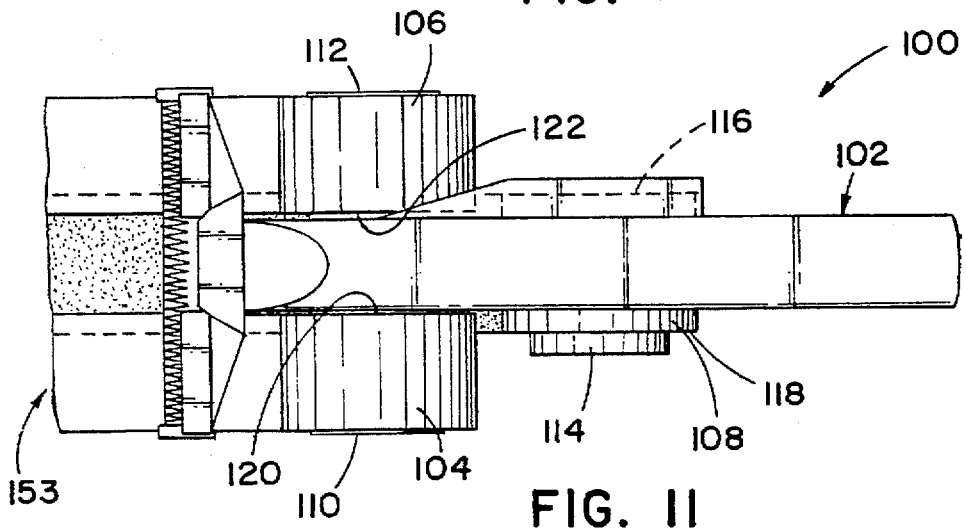
FIG. 11 is a plan view of the apparatus shown in FIG. 10.
Figure 12:
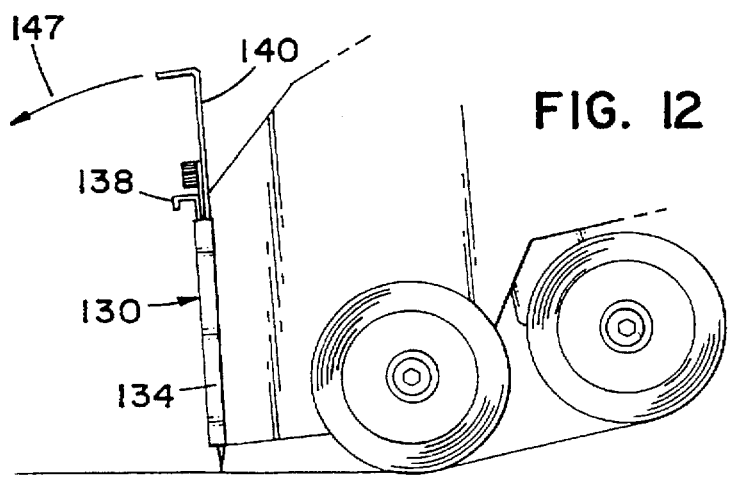
FIG. 12 is a diagram illustrating the use of the dispenser of FIG. 10.

FIGS. 10–13 illustrate a preferred embodiment of a device for dispensing the linerless double-backed adhesive tape structure of the present invention in a three tape strip configuration. A dispenser 100 has a frame 102 to which is rotatably mounted three tape rolls 104, 106 and 108. Each of tape rolls 104, 106 and 108 are mounted on a hub member 110, 112 and 114, respectively. Tape rolls 104, 106 and 108 are mounted on hub members 110–114 for rotation about rotational axes that are parallel to each other as illustrated more specifically in FIG. 11. In the preferred embodiment the rotational axes of tape rolls 104, 106 and 108 are disposed in a plane generally parallel to the plane of the unwind path of tape roll 108. Each of tape rolls 104–108 have an adhesive coated side and an adhesive free side. Tape rolls 104 and 106 are wound about hub members 110 and 112 with the adhesive coated side of the tape facing outward away from the hub member. The adhesive coated side of tape roll 104 is shown at 113. Tape roll 108 is wound on hub member 114 with an adhesive side 115 facing inward with respect to hub member 114. Tape roll 108 has outer edges 116 and 118. Tape roll 104 has an innner edge 120 disposed in a plane spaced inwardly with respect to a plane in which outer edge 118 lies. Tape roll 106 has an inner edge 122 which lies in a plane spaced inwardly with respect to a plane containing outer edge 116 of tape roll 108. Thus as tape is unwound from tape rolls 104, 106 and 108 the adhesive coated sides of tape rolls 104 and 106 overlap the inwardly facing adhesive coated side 115 of tape roll 108 as illustrated in FIG. 11. As shown in the preferred embodiment of FIG. 11 tape rolls 104 and 106 are mounted on opposite sides of frame 102. Extending from frame 102 is a handle 126. At a forward end 128 of frame 102 an apparatus 130 is provided for cutting the tape construction as it is dispensed. Apparatus 130 is more specifically shown in FIG. 13. A cutting blade 132 comprising a generally planar member 133 is mounted in a guide 134 attached to frame 102. Member 133 has a toothed blade portion 136 and a flange at 138. Extending from guide 134 is a member 140 having an elongate opening 142 therein. A post 144 extends through opening 142 and is attached to frame 102. A spring 146 is wound about post 144 and has spring arms 148 and 149 engaging flange 138. Spring 146 normally biases cutting blade 132 toward a retracted position shown in solid lines in FIG. 13. When it is desired to sever the tape structure that is dispensed, the operator presses down as indicated by the arrow at 151 against the biasing force of spring 146 which extends toothed blade portion 136 to the position shown in dotted lines in FIG. 13. In this extended position the tape structure can be severed as shown in FIG. 12. Cutting of the tape structure is facilitated by tilting dispenser 100 forward as shown by the arrow at 147. In its normally retracted position cutting blade 132 does not interfere with the unwind of the tape structure from dispenser 100. This also provides a safety feature since the blade is not exposed unless it is needed to cut the tape structure. In an alternative design, blade 132 could be non-retractable. In this case, as well as in the case of a retractable blade, a protective cover may be provided.

As described, tape rolls 104 and 106 are positioned on frame 102 with respect to tape roll 108 so that the unwind paths of rolls 104 and 106 are common with the unwind path of tape roll 108 beginning at tape rolls 104 and 106 whereby strips from rolls 104 and 106 are adhered to the tape strip being dispensed from roll 108 to form the three tape linerless double-backed adhesive tape structure illustrated in FIG. 1. As specifically illustrated in FIGS. 10 and 11 an unwind path of tape roll 104 and an unwind path of tape roll 106 join and become common with the unwind path of tape roll 108 at the outer periphery of tape rolls 104 and 106 such as that illustrated at 105. FIG. 12 shows at 153 the three tape double-backed adhesive structure of FIG. 1 as it is thereby dispensed. Dispenser 100 is particularly useful in applying the three tape double-backed adhesive tape structure of the present invention to containers for sealing and unitizing said containers as shown in FIGS. 2 and 3.

Figure 14:
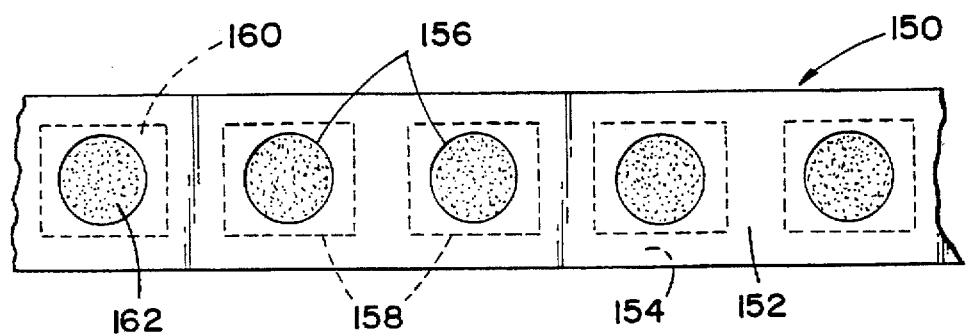
FIG. 14 is a plan view showing an alternative embodiment of a linerless double-backed adhesive tape structure according to the present invention.
Figure 15:
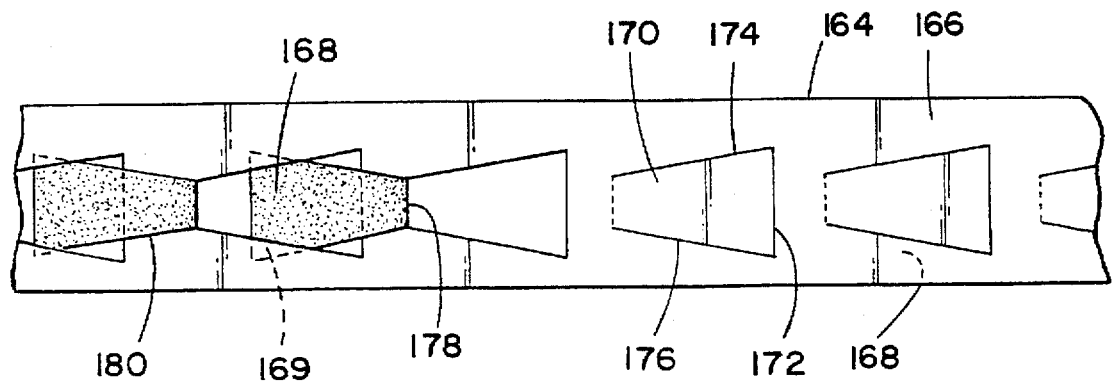
FIG. 15 is another alternative embodiment of the linerles double-backed adhesive tape structure of the present invention.

FIGS. 14 and 15 illustrate two additional alternative embodiments of a linerless double-backed adhesive tape structure according to the present invention. In the embodiment of FIG. 14 a tape strip 150 has an adhesive free side 152 and an adhesive coated side 154. A plurality of holes 156 are punched in tape strip 150 along its axis of elongation. A plurality of tape segments 158 are adhered to adhesive coated side 154 covering holes 156. Each of tape segments 158 has an adhesive coated side as illustrated at 160 which is in face-to-face contact with the adhesive on side 154 of strip 150. A portion 162 of adhesive coated side 160 is exposed through holes 156. The linerless double backed adhesive tape of FIG. 14 can be used in a manner similar to the previously discussed embodiments in unitizing and sealing a plurality of containers. For examples tape strip 150 can be placed with adhesive side 154 in contact with and sealing the top of a container while exposed adhesive 162 faces outward and can be adhered to an adjacent container.

In the embodiment of FIG. 15 a tape strip 164 has an adhesive free side 166 and an adhesive coated side 168. Tape strip 164 has three sided die cuts 170 spaced apart along its axis of elongation. Referring to one of such die cuts, each is trapezoidal in shape though other shapes and configurations may also be used. The cut is made along a base 172 and sides 174 and 176 defining die cut segments 180. Each die cut is left with a fold line at 178. In use, die cut segments 180 are folded back about fold lines 178 to expose adhesive coated side 168. The exposed portions of adhesive coated side 168 of segments 180 face in a direction opposite that of the unexposed portion of side 168. As shown at 169 the corners of segments 180 are tucked beneath the underlying hole so that there is adhesive-to-adhesive contact between the corners and adhesive coated side 168. Segments 180 may also be folded about fold line 178 through the hole formed by die cut 170. With reference to FIG. 15 this fold would be into the plane of the drawing. Adhesive coated side 168 of segment 180 is then exposed through the hole formed by an adjacent die cut with the corners of segment 180 in adhesive-to-adhesive contact with the adhesive coated back side 168 of tape strip 164. Thus, the embodiment shown in FIG. 15 can also be used in a manner similar to that of FIG. 14 to seal and unitize a plurality of containers. Tape strip 164 can be applied with adhesive coated side 168 adhering to and sealing a container with the exposed adhesive portions of segments 180 in contact with and adhering to an adjacent container.

It should be now understood that the present invention of a linerless double-backed adhesive tape structure has significant advantages over the prior art and is useful in a wide variety of applications. As a unitizing tape, the present invention eliminates the need that existed in the prior art for a plastic wrapping used to secure boxes or containers on a pallet for transportation or storage. The tape of the present invention performs the dual function of both sealing the boxes and securing the boxes to each other. These examples of uses of the present invention are by no means exclusive and it is understood that variations of the specific embodiments disclosed herein, nevertheless, are contemplated within the spirit and scope of the present invention.

What is claimed is:

1. A method of unitizing a plurality of containers comprising placing on each of said containers a linerless double-backed adhesive tape structure having a first tape strip with an adhesive on one side thereof and second and third tape strips each having an adhesive on one side thereof, said second and third tape strips overlapping said first strip along the edges of said first strip with said adhesive sides of said second and third strips facing said adhesive side of said first strip thereby joining said strips together with an exposed adhesive side of said first strip facing in an opposite direction to an exposed adhesive side of said second and third strips, said exposed adhesive sides of said second and third strips being adhered to said container;

stacking said containers on one another with said exposed adhesive surface of said first tape strip on each container joined and adhered to at least a portion of the exposed adhesive surface of said first tape strip on an adjacent container.

2. A method of unitizing a plurality of containers in accordance with claim 1 further comprising the step of causing at least a portion of said first tape strip to be raised above the plane containing said second and third tape strips.

3. A method in accordance with claim 1 further comprising the step of placing said containers forming one layer of the stack with the linerless double-backed adhesive adhered to said containers oriented orthogonally with respect to the linerless double-backed adhesive structdure adhered to said containers forming an adjacent layer.

4. A method of unitizing a plurality of boxes comprising the steps of:

sealing the top and bottom of each box with a linerless double-backed adhesive tape structure having a first tape strip with adhesive on one side thereof and second and third tape strips each having an adhesive on one side thereof, said second and third tape strips overlapping said first strip along the edges of said first strip with said adhesive sides of said second and third steps facing said adhesive side of said first strip thereby joining said strips together with an exposed adhesive side of said first strip facing in an opposite direction to an exposed adhesive side of said second and third strips, said exposed adhesive sides of said second and third strips being adhered to the box; and stacking the boxes on one another with said exposed adhesive surface of said first tape strip on each box joined and adhered to at least a portion of said exposed adhesive surface of said first tape strip on an adjacent box.

5. A method of unitizing a plurality of boxes in accordance with claim 4 further comprising the step of adhering said linerless double-backed adhesive tape structure to opposite ends of each of said boxes and securing the ends of each box to the ends of an adjacent box by joining the exposed adhesive surfaces of said first tape strips on each box.

6. A method in accordance with claim 5 further comprising the step of placing said boxes forming one layer of the stack with the linerless double-backed adhesive tape structure adhered to said boxes oriented orthogonally with respect to the linerless double-backed adhesive tape structure adhered to said boxes forming an adjacent layer of the stack.

7. A method of unitizing a plurality of containers comprising the steps of:

placing on a surface of each container a single-sided adhesive tape having an adhesive coated side and an adhesive free side with the adhesive coated side adhering to said surface;

folding at least one lateral edge of said tape to expose a portion of the adhesive coated side;

stacking said containers together with said exposed portion of said adhesive surface of said tape being adhered to a surface of an adjacent container.

8. A method in accordance with claim 7 further comprising the step of placing said containers forming one layer of the stack with the single-sided adhesive tape adhered to said containers oriented orthogonally with respect to the single-sided adhesive tape adhered to said containers forming an adjacent layer of the stack.

9. A method of sealing and unitizing a plurality of boxes comprising placing on the top of each of said boxes a linerless double-backed adhesive tape structure having a first tape strip with an adhesive on one side thereof and second and third tape strips each having an adhesive on one side thereof, said second and third tape strips overlapping said first strip along the edges of said first strip with said adhesive sides of said second and third strips facing said adhesive side of said first strip thereby joining said strips together with an exposed side of said first strip facing in an opposite direction to an exposed adhesive side of said second and third strips, and aligning said tape structure on the top whereby said second or third tape strip seals the top, sealing the bottom of each of said boxes with a single sided adhesive tape, stacking said boxes on one another with said exposed adhesive surface of said first tape strip on the top of each box adhered to the bottom of an adjacent box at a location spaced apart from said single sided adhesive tape.

10. A method in accordance with claim 9 further comprising the step of placing said boxes forming one layer of the stack with the linerless double-backed adhesive tape structure adhered to said boxes oriented orthogonally with respect to the linerless double-backed adhesive tape structure adhered to said boxes forming an adjacent layer of the stack.

11. A method of unitizing and sealing a plurality of containers comprising:

placing on each of said containers a double-backed adhesive tape structure having a first strip portion for providing one exposed surface with an adhesive thereon and a second strip portion for providing a second adhesive coated surface that is adhered to said container for sealing said container;

stacking said containers together with the exposed adhesive surface of said tape structure on each container being adhered to at least a portion of the exposed adhesive surface of said tape on an adjacent container.

12. A method in accordance with claim 11 further comprising the step of placing said containers forming one layer of the stack with the double backed adhesive structure adhered to said containers oriented orthogonally with respect to the double backed-adhesive structure adhered to said containers forming an adjacent layer of the stack.

13. A method in accordance with claim 11 further comprising the step of placing a sheet of material across said containers forming the top layer of the stack with said sheet material being adhered to the exposed adhesive coated surface of the double-bonded adhesive structure adhered to said containers.

\* \* \* \* \*